United States Patent
Chan et al.

(10) Patent No.: US 8,824,353 B2
(45) Date of Patent: Sep. 2, 2014

(54) MOBILITY ROUTE OPTIMIZATION IN A NETWORK HAVING DISTRIBUTED LOCAL MOBILITY ANCHORS

(75) Inventors: Hinghung Anthony Chan, Plano, TX (US); Yangsong Xia, Nanjing (CN)

(73) Assignee: FutureWei Technologies, Inc., Plano, TX (US)

( * ) Notice: Subject to any disclaimer, the term of this patent is extended or adjusted under 35 U.S.C. 154(b) by 383 days.

(21) Appl. No.: 12/850,492

(22) Filed: Aug. 4, 2010

(65) Prior Publication Data
US 2011/0080866 A1 Apr. 7, 2011

Related U.S. Application Data

(60) Provisional application No. 61/248,365, filed on Oct. 2, 2009, provisional application No. 61/260,285, filed on Nov. 11, 2009, provisional application No. 61/311,669, filed on Mar. 8, 2010.

(51) Int. Cl.
*H04B 7/14* (2006.01)

(52) U.S. Cl.
USPC ......... 370/315; 370/331; 455/439; 455/432.1

(58) Field of Classification Search
None
See application file for complete search history.

(56) References Cited

U.S. PATENT DOCUMENTS

| | | | |
|---|---|---|---|
| 7,127,700 B2 | 10/2006 | Large | |
| 7,603,477 B2 * | 10/2009 | Choi et al. | 709/238 |
| 7,676,595 B2 | 3/2010 | Ettikan | |
| 7,840,217 B2 * | 11/2010 | Patel et al. | 455/439 |
| 7,929,556 B2 * | 4/2011 | Melia et al. | 370/401 |
| 7,965,695 B2 | 6/2011 | Valko et al. | |
| 8,040,845 B2 * | 10/2011 | Oulai et al. | 370/329 |
| 8,068,840 B2 * | 11/2011 | Patel et al. | 455/439 |
| 8,085,793 B2 | 12/2011 | Krishnan et al. | |
| 8,102,815 B2 | 1/2012 | Krishnan | |
| 8,160,038 B1 * | 4/2012 | Zhao et al. | 370/338 |
| 8,170,010 B2 | 5/2012 | Bachmann et al. | |

(Continued)

FOREIGN PATENT DOCUMENTS

| | | |
|---|---|---|
| CN | 101175316 A | 5/2008 |
| CN | 101212773 A | 7/2008 |

(Continued)

OTHER PUBLICATIONS

Gundavelli, S., et al., "Proxy Mobile IPv6", RFC 5213, Standards Track, Aug. 2008, pp. 41-67.

(Continued)

*Primary Examiner* — Michael J Moore, Jr.
(74) *Attorney, Agent, or Firm* — Slater & Matsil, L.L.P.

(57) ABSTRACT

A method, system and device for achieving an optimized mobility routing path are disclosed. A preferred embodiment comprises a method of cutting unnecessary network tunnels. In a mobile network system, transmitting data packets through a tunnel is an effective way to provide network location privacy. An optimization method is proposed to consolidate two tunnels connecting with a network element such as a first distributed local mobility anchor (D-LMA). The first D-LMA informs a data packet sender such as a second D-LMA of the destination address saved in the first D-LMA. The second D-LMA updates its destination address accordingly and sends subsequent data packets to the destination directly. By applying this optimization method, a network system provides a further optimized route for data packets as well as location privacy.

20 Claims, 10 Drawing Sheets

(56) References Cited

U.S. PATENT DOCUMENTS

| | | | |
|---|---|---|---|
| 8,265,037 B2* | 9/2012 | Park et al. | 370/331 |
| 8,385,263 B2* | 2/2013 | Hirano et al. | 370/328 |
| 8,570,941 B2* | 10/2013 | Tsirtsis et al. | 370/328 |
| 2006/0018291 A1 | 1/2006 | Patel et al. | |
| 2006/0291446 A1 | 12/2006 | Caldwell et al. | |
| 2007/0189219 A1 | 8/2007 | Navali et al. | |
| 2007/0254661 A1 | 11/2007 | Chowdhury et al. | |
| 2008/0084847 A1 | 4/2008 | Xia et al. | |
| 2009/0040964 A1* | 2/2009 | Zhao et al. | 370/328 |
| 2009/0080441 A1 | 3/2009 | Krishnan et al. | |
| 2009/0248708 A1 | 10/2009 | Balasubramanian et al. | |
| 2009/0290529 A1* | 11/2009 | Toyokawa et al. | 370/315 |
| 2009/0303932 A1 | 12/2009 | Tsirtsis et al. | |
| 2009/0310564 A1 | 12/2009 | Kim et al. | |
| 2010/0046419 A1 | 2/2010 | Hirano et al. | |
| 2010/0080172 A1 | 4/2010 | Jin et al. | |
| 2010/0082796 A1 | 4/2010 | Akiyoshi | |
| 2010/0150055 A1 | 6/2010 | Hori et al. | |
| 2010/0177698 A1* | 7/2010 | Salmela et al. | 370/328 |
| 2010/0208691 A1 | 8/2010 | Toyokawa | |
| 2010/0214982 A1 | 8/2010 | Hirano et al. | |
| 2010/0268804 A1 | 10/2010 | Aso et al. | |
| 2010/0284329 A1* | 11/2010 | Park et al. | 370/328 |
| 2010/0296481 A1 | 11/2010 | Weniger et al. | |
| 2010/0303031 A1* | 12/2010 | Rune | 370/329 |
| 2011/0002248 A1* | 1/2011 | Hirano et al. | 370/310 |
| 2011/0002300 A1* | 1/2011 | Lee et al. | 370/331 |
| 2011/0026453 A1* | 2/2011 | Yan | 370/328 |
| 2011/0080872 A1* | 4/2011 | Chan et al. | 370/328 |
| 2011/0116450 A1* | 5/2011 | Hirano et al. | 370/328 |
| 2011/0149839 A1* | 6/2011 | Toyokawa et al. | 370/328 |
| 2011/0170479 A1* | 7/2011 | Chan et al. | 370/328 |
| 2011/0246629 A1* | 10/2011 | Savolainen et al. | 709/220 |
| 2011/0255473 A1* | 10/2011 | Wu et al. | 370/328 |
| 2012/0120872 A1* | 5/2012 | Korhonen et al. | 370/328 |
| 2012/0140719 A1* | 6/2012 | Hui et al. | 370/329 |

FOREIGN PATENT DOCUMENTS

| | | |
|---|---|---|
| WO | 0167798 A1 | 9/2001 |
| WO | 2006012511 A1 | 2/2006 |
| WO | WO 2009/016059 A1 | 2/2009 |
| WO | 2009044539 A1 | 4/2009 |

OTHER PUBLICATIONS

International Search Report regarding International Patent Application No. PCT/CN2010/076825, Dec. 16, 2010, 3 pages.

Written Opinion of the International Searching Authority regarding International Patent Application No. PCT/CN2010/076825, Dec. 16, 2010, 5 pages.

International Search Report regarding International Patent Application No. PCT/CN2010/076991, dated Dec. 23, 2010, 3 pages.

Written Opinion of the International Searching Authority regarding International Patent Application No. PCT/CN2010/076991, dated Dec. 23, 2010, 4 pages.

\* cited by examiner

US 8,824,353 B2

MOBILITY ROUTE OPTIMIZATION IN A NETWORK HAVING DISTRIBUTED LOCAL MOBILITY ANCHORS

This application claims the benefit of U.S. Provisional Application No. 61/248,365, filed on Oct. 2, 2009, entitled "Distributed Mobility Anchors for Mobility Management," U.S. Provisional Application No. 61/260,285, filed on Nov. 11, 2009, entitled "Distributed Mobility Anchors for Network-Based Mobility," and U.S. Provisional Application No. 61/311,669, filed on Mar. 8, 2010, entitled "Route Optimization with Distributed Mobility Anchors" all of which are hereby incorporated herein by reference.

TECHNICAL FIELD

The present invention relates generally to network communication technology, and more particularly to a system and method for achieving an optimal data transmission path by removing unnecessary transitions in a Proxy Mobile Internet Protocol (PMIP) network.

BACKGROUND

Wireless communication systems have become an important means by which many people worldwide have come to communicate. A wireless communication system interconnects many nodes by using electromagnetic waves, such as radio waves, rather than wires commonly used in a fixed telephone network system. A wireless communication system often consists of many mobile devices and a plurality of base stations. A base station serves a mobile device when the mobile device enters a region associated with the base station.

A modern communication system includes many interconnected networks, which consist of both wireless networks and wired communication networks. In a communication network, each mobile device has its own Internet Protocol (IP) address. The IP addresses are used to transmit data packets from one mobile device to another device. In order to serve a mobile device travelling (or roaming) from a registered network to a visited network, Mobile IP (MIP) has been proposed by the Internet Engineering Task Force (IETF) to allow mobile device users to move from one network to another while maintaining a permanent IP address.

A version of MIP is Mobile IP version 6 (MIPv6). In a MIPv6 based communication system, a mobile device has a Home Address (HoA). When the mobile device changes its location and moves into a visited network, it receives a Care-of Address (CoA) from the visited network. In a MIPv6 mobile network, the mobile device then sends a binding update to a home agent in its home network. The binding update causes the home agent to establish a binding between the HoA and the CoA. Subsequently, the home network forwards data packets destined to the mobile device's HoA to the mobile device's current CoA.

Proxy MIPv6 (PMIPv6) is a variant of MIPv6 where the mobile device is not involved in the updating of its current location. Instead, PMIPv6 relies on a proxy mobility agent, such as Mobility Access Gateway (MAG), to detect a mobile device's attachments and detachments and signal the binding update to the a local mobility anchor (LMA). PMIPv6 is promulgated to support an efficient binding update by assigning the proxy agents, such as the MAGs, to report the location change to the home LMA.

One disadvantage of the existing PMIPv6 based network is the triangle routing problem caused by having the LMA in one single network as illustrated in FIG. 1. FIG. 1 includes a home network 140, a Home LMA (H-LMA) 150, a visited network 130, a MAG 160, a Mobile Node (MN) 110 and a Correspondent Node (CN) 120. CN is an abbreviation of Correspondent Node, which is a communication partner of the MN. The MN 110 and the CN 120 may be geographically close to each other, but both the MN 110 and the CN 120 are far away from the H-LMA 150. The MN 110 is located within a visited network 130.

In a PMIPv6 network, the MN 110 may be a notebook computer, a mobile phone or a Personal Digital Assistant (PDA). The MN 110 has two IP addresses in a PMIPv6 network. The H-LMA 150 allocates an HoA to the MN 110. The HoA is used to communicate with the CN 120. This address does not change and serves the purpose of identification of the MN 110. In contrast, a proxy-CoA is a temporary address the MN 110 acquires when it leaves the home network 140 and enters the visited network 130. In this PMIPv6 network example, when the MN 110 is located within the visited network 130, the MAG 160 detects the attachment and signals a binding update to the H-LMA 150 located in the home network 140. The H-LMA 150 binds the proxy-CoA with the HoA to map the MN's 110 current location with its HoA.

When the CN 120 sends messages to the MN 110, the messages are addressed to the HoA of the MN 110. In accordance with the HoA attached with the messages, the messages are directed to the home network where the H-LMA 150 intercepts the message. The H-LMA 150 tunnels the messages to the MN's 110 visited network based on its proxy-CoA. The network repeats this triangle routing until all messages from the CN 120 reach the MN 110. Apparently, the communication path is unnecessarily long, and results in inefficient routing and high message delays.

Accordingly, what is needed in the art is an optimized mobility routing mechanism. More particularly, an optimal network system having an optimized routing route between a CN and an MN.

SUMMARY OF THE INVENTION

These and other problems are generally solved or circumvented, and technical advantages are generally achieved, by preferred embodiments of the present invention which provide a method and system for optimizing mobility routing in a proxy mobile internet protocol network.

In accordance with a preferred embodiment, a method of transmitting data comprises providing a first network, the first network comprising a first distributed local mobility anchor and a first mobility access gateway. A second network is provided, the second network comprising a second distributed local mobility anchor and a second mobility access gateway. A first data packet is transmitted directly from the first network to the second mobility access gateway.

In accordance with another preferred embodiment, a method of transmitting data comprises providing a first mobility access gateway and receiving a first series of data packets at the first mobility access gateway, the first series of data packets originating from a common source, wherein at least one of the first series of data packets is received from a first distributed local mobility anchor and at least one of the first series of data packets is received from other than the first distributed local mobility anchor.

In accordance with yet another preferred embodiment, a method for transmitting data comprises providing a first network, the first network comprising a first mobility access gateway and a first distributed local mobility anchor communicably coupled to the first mobility access gateway. A second network is provided, the second network comprising a first network element communicably coupled to the first distributed local mobility anchor. A first connection is generated between the first mobile access gateway and the first network element, and at least one data packet is transmitted along the first connection directly between the first network element and the first mobile access gateway.

In accordance with yet another preferred embodiment, a system for transmitting data comprises a first network comprising a first mobile access gateway and a second network comprising a second mobile access gateway and a first distributed local mobility anchor, wherein the second mobile access gateway is configured to receive a first data packet directly from the first distributed local mobility anchor and to receive a second data packet directly from the first network.

An advantage of a preferred embodiment is an optimized path for the transmission of data packets.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a system having distributed local mobility anchors for achieving optimized routing in a Proxy Mobile IPv6 (PMIPv6) based network. The invention may also be applied, however, to other communication networks, such as a $3^{rd}$ Generation Partnership Project (3GPP) network having GPRS Tunneling Protocol (GTP) for mobility management.

Figure 1:
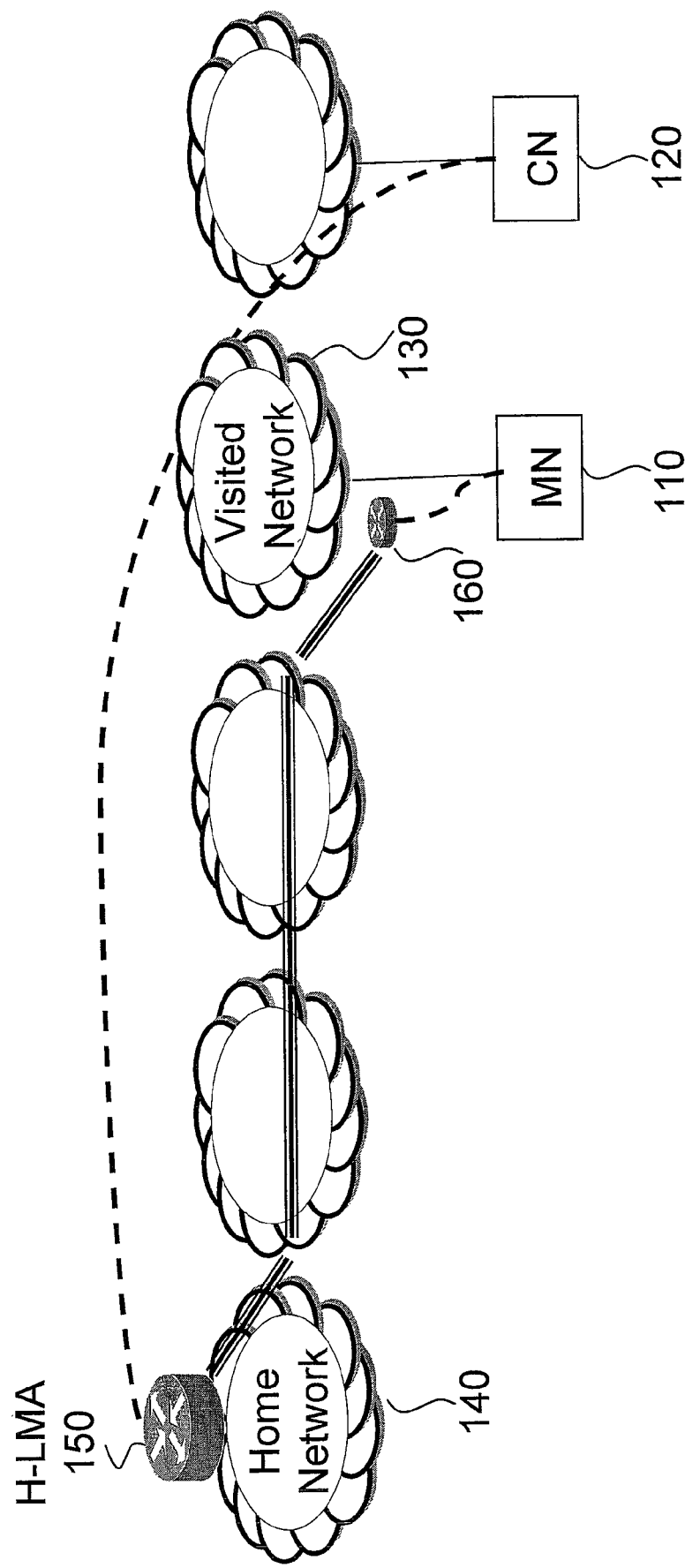
FIG. 1 illustrates an example of the triangle routing problem in prior art.
Figure 2:
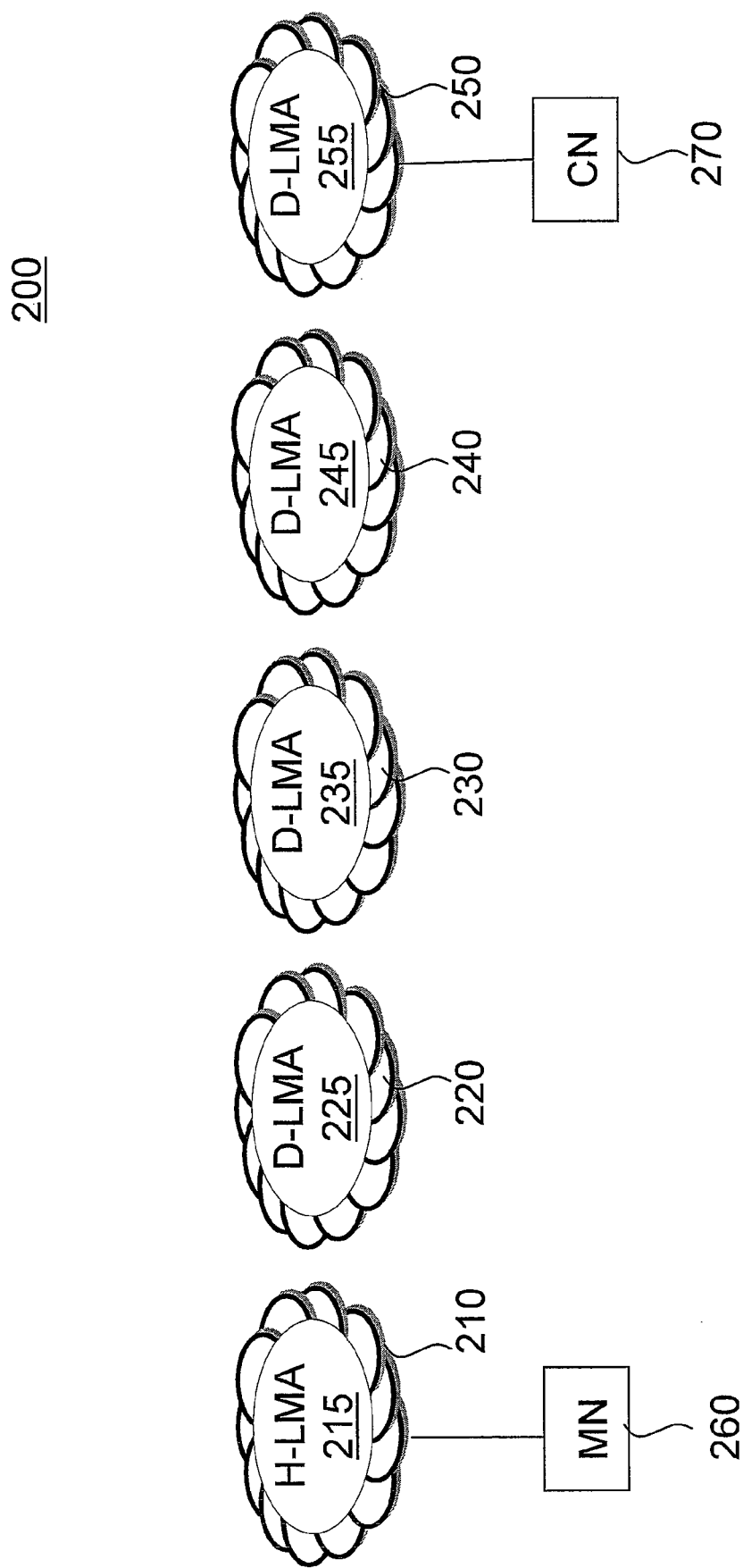
FIG. 2 illustrates a network having a home local mobility anchors and a plurality of distributed local mobility anchors in accordance with an embodiment of the present invention.

With reference now to FIG. 2, a network system 200 is illustrated. The illustrated network system 200 may include a home network 210, a second network 220, a third network 230, a fourth network 240 and a fifth network 250. The network system 200 may also include a first Mobile Node (MN) 260 and a Correspondent Node (CN) 270. It should be recognized that while FIG. 2 may illustrate the network system 200 having five networks, the network system 200 may accommodate any number of networks and still remain within the scope of the present invention.

Figure 3:
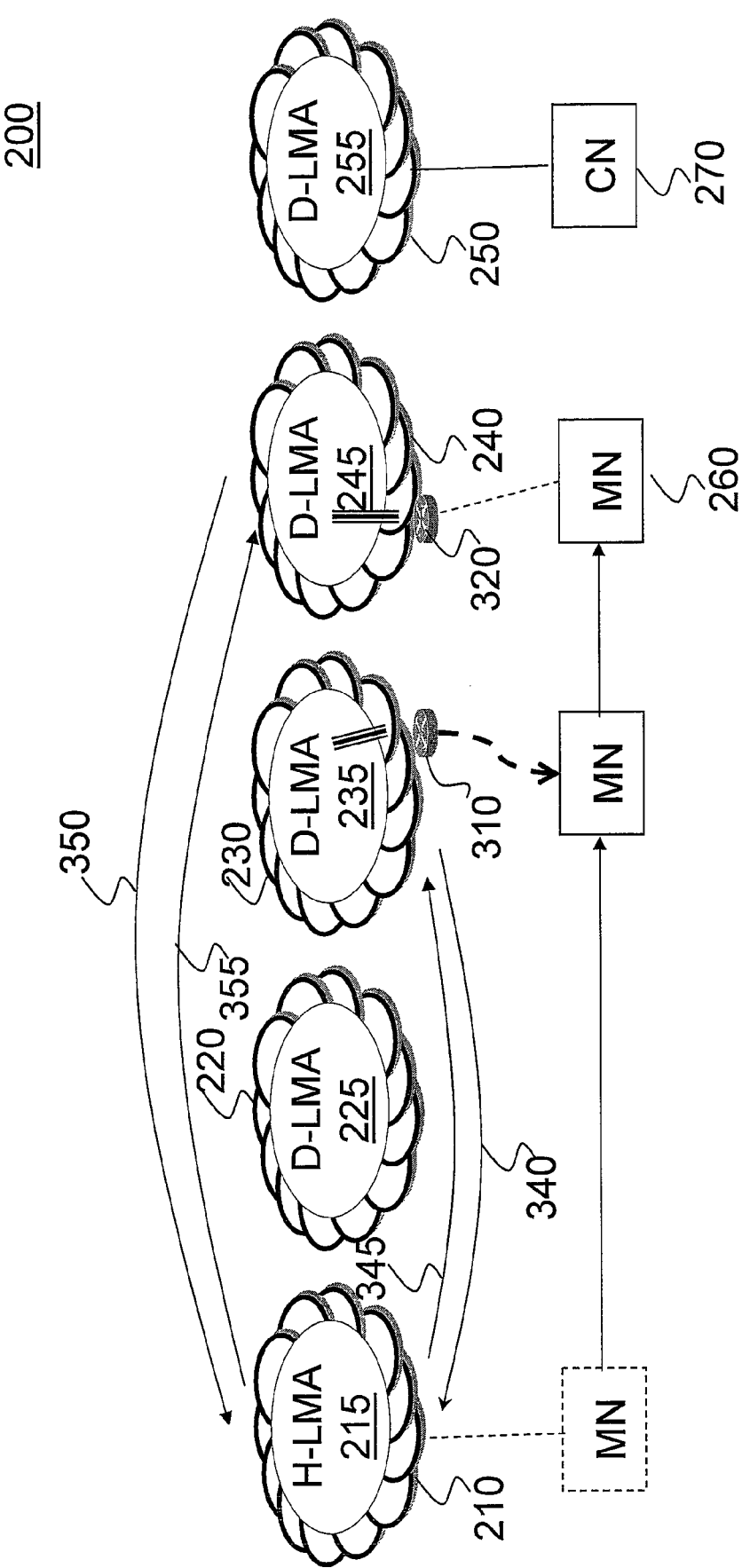
FIG. 3 illustrates a binding process for a mobile node entering a region associated with a distributed local mobility anchor in accordance with an embodiment of the present invention.

The first MN 260 may be a mobile device such as a notebook computer, a mobile phone, a Personal Digital Assistant (PDA), or the like. In the network system 200, the first MN 260 is registered with the home network 210. In the home network 210, a Home Local Mobility Anchor (H-LMA) 215 is responsible for issuing a Home Address (HoA) to the first MN 260, which is registered at the home network 210. In the home network 210, the H-LMA 215 issues an HoA to the first MN 260, which will not change when the first MN 260 leaves the home network 210 where the first MN 260 is registered and migrates to another network (e.g., the third network 230 as illustrated in FIG. 3). However, as one of ordinary skill in the art will recognize, the present embodiments are not limited to only the HoA identifier, and also encompass the use of other identifiers which do not change as the first MN 260 moves between networks.

The CN 270 may comprise any stationary or mobile device, such as a computer or telephone, that can communicate with the first MN 260 and has a relatively fixed position within the network system 200. For example, the CN 270 may have a static, fixed address within the network system 200 that will not change over time.

In the system of networks 200 each of the individual networks may comprise one or more computers or other devices connected to a common server that preferably share a common Internet Protocol (IP) address. For example, the networks may be an access service network (ASN), a connectivity service network (CSN), a plurality of ASNs or CSNs, combinations of these, or the like. Additionally, each of the individual networks may be located in various geographic locations, wherein some networks may be geographically close to each other and other networks may be geographically far away from each other. For example, the fourth network 240 and the fifth network 250 may be close to each other geographically, but they may be far removed from the first network 210.

Additionally, each of the individual networks may include certain infrastructure to assist it in providing communication services, such as wireless access points (WAPs), base transceiver stations (BTSs), base station controllers (BSCs), routers, switches, bridges, and/or routing logic circuitry. Suitable networks may include the Long Term Evolution (LTE) and Evolved Packet Core (EPC), world-wide interoperability for microwave access (WiMAX), Wireless Fidelity (Wi-Fi), code division multiple access (CDMA), wideband CDMA (WCDMA), orthogonal frequency division multiple access (OFDMA), time division multiple access (TDMA), global system for mobile communications (GSM), enhanced data for GSM evolution (EDGE), universal mobile telecommunications system (UMTS), advanced mobile phone service (AMPS), or the like.

Furthermore, each of the individual networks (e.g., the first home network 210, the second network 220, the third network 230, the fourth network 240, and the fifth network 250) may comprise a number of subnetworks, or distinctly addressable regions within the individual networks that may be addressed separately from each other while still sharing the common IP address. Furthermore, it should be recognized that while FIG. 2 may illustrate the system of networks 200 having five networks with various subnetworks, the system of networks 200 may accommodate any number and configuration of networks while still remaining within the scope of the present invention.

The network system may preferably operate with a mobility management protocol such as Proxy Mobile Internet Protocol version 6 (PMIPv6). In the PMIPv6 protocol, the first MN 260 is assigned an initial home address (HoA) of 128 bits by the first home network 210 to which it is registered. Then, when the first MN 260 moves from network to network (e.g., from the first home network 210 to the third network 230, as further discussed below with respect to FIG. 3), the first MN 260 maintains the original HoA. However, the system of networks 200 itself, through the use of local mobility anchors (LMAs, discussed further below), are updated with the current address of the first MN 260 and can route the data packets to the first MN's 260 current location by appending a "Care-of" address (CoA) onto the data packet and routing the data packet to the first MN's 260 current location.

However, as one of ordinary skill in the art will recognize, the PMIPv6 protocol described above is intended to be illustrative only, and is not intended to limit the present invention to the PMIPv6 protocol. Any other suitable mobility management protocol, such as PMIPv4, mobile IP, 3GPP network having GPRS Tunneling Protocol (GTP), combinations of these, or the like, may alternatively be utilized with the present invention, and all of these alternative mobility management protocols are fully intended to be included within the scope of the present invention.

Preferably, the mobility management protocol may use an ANYCAST addressing technique to address and send data packets from point to point. In the ANYCAST technique, each of the individual LMAs (discussed further below and comprising the H-LMA 215, the first D-LMA 225, the second D-LMA 235, the third D-LMA 245, and the fourth D-LMA 255) may own a set of IP prefixes which the individual LMAs may use to allocate HoAs to, e.g., the first MN 260. The HoA prefixes of all of the individual LMAs may form a superset of HoA prefixes, some of which may be aggregatable and some of which may not be aggregatable.

In order to expedite communications, all of the individual LMAs advertise the superset of common ANYCAST addresses/prefixes. The originating network, such as the first network 210 if the first MN 260 is transmitting the data packet, includes with the data packet both the HoA along with the ANYCAST address/prefix. With the ANYCAST address/prefix, a data packet from the first MN 260 may be routed to any of the individual LMAs broadcasting the superset of ANYCAST addresses/prefixes, such as the nearest LMA advertising the superset, taking into account not only geography but also the topology of the networks themselves. In this fashion, if the geographically closest network is interrupted by an interruption of service, the data packet can be routed to the next closest computer advertising the superset, thereby helping to optimize the overall performance of the ANYCAST technique.

However, as one of ordinary skill in the art will recognize, the ANYCAST addressing technique described above is merely an exemplary embodiment and is not intended to limit the scope of the present invention. Any other suitable addressing or routing technique may alternatively be utilized instead of the ANYCAST addressing system. All such addressing systems are fully intended to be included within the scope of the present invention.

The network system 200 may have one H-LMA 215, although the network system 200 may alternatively comprise multiple H-LMAs. The H-LMA 215 may provide three logical functions pertaining to the network system 200. First, the H-LMA 215 may provide a home network prefix or home address allocation function in which the H-LMA 215 allocates a HoA or HoA prefix to the first MN 260, which is registered to the home network 210.

Secondly, the H-LMA 215 may provide an internetwork location management function in which the H-LMA 215 may manage and track the location of the first MN 260 within the network system 200. This internetwork location management function may also include a mapping between a Care-of Address (CoA) indicating the current location of the first MN 260 and the HoA of the first MN 260. The process of acquiring a CoA is described in more detail below with regard to FIG. 3.

Thirdly, the H-LMA 215 may perform a mobility routing function, in which the H-LMA 215 may intercept packets from the first MN 260 and then forward the packets to their intended destination. Likewise, after receiving data packets addressed to the first MN 260, the H-LMA 215 may forward the data packets to the first MN 260 based upon the first MN's 260 HoA.

It should be noted that the three logical functions in the H-LMA 215 may be considered separate and one function does not necessarily need to be co-located with the other two functions. As such, the H-LMA 215 does not need to be located within one single physical entity. In fact, it is possible to have one or more physical entities provide the various functions described above. Any combination of functionality and physical location may alternatively be utilized with the present embodiments, and all such combinations are fully intended to be included within the scope of the present embodiments.

Further illustrated in FIG. 2 is a plurality of Distributed Local Mobility Anchors (D-LMAs), such as a first D-LMA 225 (located in the second network 220), a second D-LMA 235 (located in the third network 230), a third D-LMA 245 (located in the fourth network 240), and a fourth D-LMA 255 (located in the fifth network 250). Each of the first D-LMA 225, second D-LMA 235, third D-LMA 245, and fourth D-LMA 255 may be populated on the subnet level of each of their respective networks (e.g., the second network 220, the third network 230, the fourth network 240, and the fifth network 250).

Additionally, the first D-LMA 225, second D-LMA 235, third D-LMA 245, and fourth D-LMA 255 may have a functionality that is reduced from the H-LMA 215. For example, while the H-LMA 215 may provide the three functionalities described above (e.g., the HoA allocation function, the inter-network location management function, and the mobility routing function), the first D-LMA 225, second D-LMA 235, third D-LMA 245, and fourth D-LMA 255 may each provide only a subset of the three functionalities without the need for the remaining functionalities. Such reduced functionality allows for the first D-LMA 225, second D-LMA 235, third D-LMA 245, and fourth D-LMA 255 to provide needed functionalities without also requiring needless and expensive replication of the entire H-LMA 125 at each of the networks.

As an example, the first D-LMA 225, second D-LMA 235, third D-LMA 245, and fourth D-LMA 255 may each provide the mobility routing function while relying upon the H-LMA 215 to provide the remaining functionalities. As such, when the first MN 260 is initially anchored to the first home network 210 and then visits the fourth network 240 (which movement is discussed further below with respect to FIG. 3), the third D-LMA 245 may take over the mobility routing function from the H-LMA 215 and intercept data packets sent from the first MN 260 in order to route them to their respective destinations without having to rely upon the H-LMA 215.

FIG. 3 illustrates a binding process that may be used during the transition of the first MN 260 from the home network 210 to the third network 230 in order to anchor and bind the first MN 260 and also transfer the functionality. In an embodiment utilizing the PMIPv6 mobility management protocol, the third network 230 may include a first Mobility Access Gateway (MAG) 310. The first MAG 310 may be responsible for detecting when the first MN 260 is entering or exiting from the third network 230. Upon such a detection, the first MAG 310 may initiate a binding update through the second D-LMA 235 to the H-LMA 215 located within the home network 210. The first MAG 330 may be implemented in either hardware or software, and may be implemented on an access router (not shown) that may be part of the third network 230.

FIG. 3 illustrates the movement of the first MN 260 from the home network 210 to the third network 230. When the first MN 260 travels within range of the third network 230, the first MAG 310 detects the first MN's 260 movement. The first MAG 310 may use its IP address as a proxy-CoA for the first MN 260 and send a binding update message including the proxy-CoA to the second D-LMA 235 on behalf of the first MN 260 using the HoA of the first MN 260.

In order to have a reliable binding update, the second D-LMA 235 identifies which H-LMA the first MN 260 is registered with by examining the HoA's prefix from the first MN 260. After the H-LMA 215 has been identified, the second D-LMA 235 may send a first authentication request 340 including the HoA and proxy-CoA as well as other needed identifiers to the H-LMA 215. If the H-LMA 215 determines that the first MN 260 with the HoA is valid, the H-LMA 215 may send a first authentication notification 345 back to the second D-LMA 235 which will anchor the first MN 260 with the second D-LMA 235. Subsequently, the second D-LMA 235 may provide the mobility routing function for the first MN 260.

FIG. 3 further illustrates the movement of the first MN 260 from the third network 230 to the fourth network 240. Once a second MAG 320 (which may be similar to the first MAG 310, discussed above) detects the attachment of the first MN 260, the second MAG 320 may use its IP address as a proxy-CoA for the first MN 260 and send a binding update message to the third D-LMA 245 on behalf of the first MN 260. The third D-LMA 245 may repeat a similar authentication process as the one described above. For example, the third D-LMA 245 may send a second authentication request 350 to the H-LMA 215 and then, once the H-LMA 215 has determined that the first MN 260 with the HoA is valid, the H-LMA 215 may send a second authentication notification 355 to the third D-LMA 245 and register the first MN 260 such that the first MN 260 is anchored to the fourth network 240 instead of the third network 230.

It should be noted that there is an interim period from the time the first MN 260 leaves the region associated with the second D-LMA 235 to the time the H-LMA 215 successfully binds the first MN's 260 HoA with the address of the third D-LMA 245. During this interim period, first, the third D-LMA 245 is capable of informing the second D-LMA 235 that the first MN 260 has attached to the second D-LMA 235. The second D-LMA 235 may store the first MN's 260 new location address in the second D-LMA's 235 memory (not shown), and the second D-LMA 235 can redirect all data packets to the third D-LMA 245 when the second D-LMA 235 receives data packets addressed to the first MN's 260 HoA during this interim period. This feature of informing a previous D-LMA of the location change described above helps to provide a smooth transition when an MN migrates from one D-LMA to another.

In order to minimize the use of stale memory values and to efficiently utilize the memory, the stored address in the memory (e.g., in cache memory) may time out after the stored address stays idle for a period determined by a timeout setting, such as between about ten minutes and about thirty minutes. The timeout setting of the new location address in the second D-LMA's 235 memory is controlled by a specified period of time, which is longer than the typical binding update period. Once the H-LMA 215 successfully binds the first MN's 260 HoA with the address of the third D-LMA 245, the first MN's 260 address saved in the second D-LMA's 235 cache memory will time out after the specified period of time expires.

Figure 4:
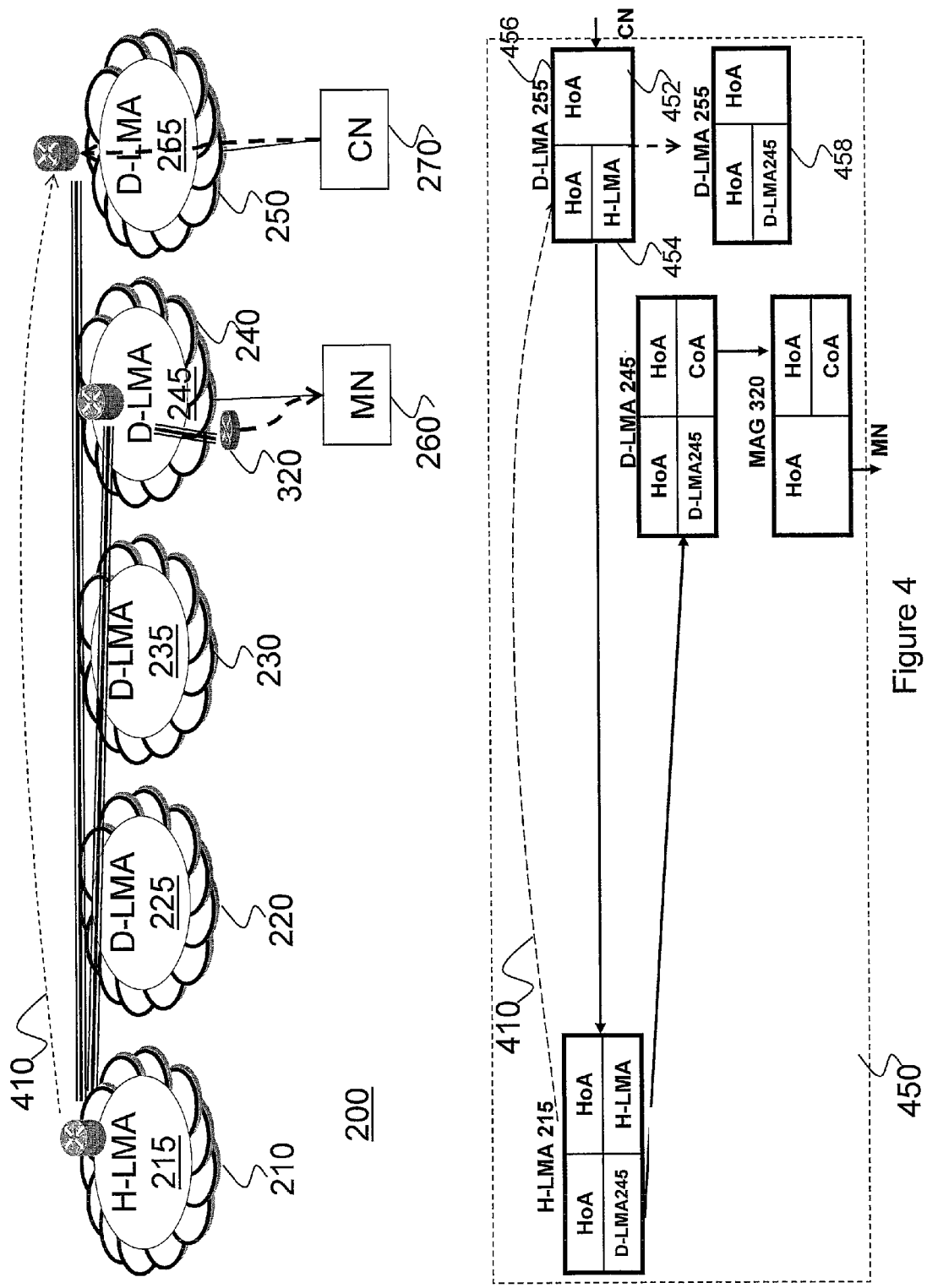
FIG. 4 illustrates a transmission of an initial data packet from a correspondent node to a mobile node in accordance with an embodiment of the present invention.

FIG. 4 illustrates an initial step in an optimized routing methodology along with a network layer destination address chart 450. In an embodiment the CN 270 may send an initial data packet addressed to the first MN's 260 HoA. When the fourth D-LMA 255 intercepts the initial data packet sent from the CN 270, the fourth D-LMA 255 may scan its memory (e.g., a cache memory) to determine whether the HoA associated with the initial data packet has been stored in its memory. If the MN's 260 HoA is already stored in the memory, which may occur from a previous communication session between the first MN 260 and the CN 270, the fourth D-LMA 255 may send the initial data packet directly to the third D-LMA 245 (not shown in FIG. 4).

If the HoA has not been stored in the memory of the fourth D-LMA 255, the fourth D-LMA 255 may direct the initial data packet directly to the H-LMA 215 (based on the prefix of the HoA). When the H-LMA 215 receives the initial data packet from the fourth D-LMA 255, the H-LMA 215 directs the initial data packet to the third D-LMA 245 based upon the most recent binding update.

However, as one of ordinary skill in the art will recognize, this type of capture by the fourth D-LMA 255 located in a network is not the only method by which a data packet may be captured from the CN 270. For example, gateway routers (such as gateways in a network that can forward data packets to an outside network) may be suitably located to intercept traffic destined for the first MN 260, and these gateway routers may contain the D-LMA or MAG functionality to intercept the data packet from the CN 270. Such a gateway router co-location method may or may not use the ANYCAST addressing technique as described above with respect to FIG. 2.

A network layer destination address chart 450 illustrates the data flow and the corresponding destination address at each network entity. In the network layer destination address chart 450, each of the entities in the network system 200 that handles the data packet has a corresponding destination address block (e.g., the fourth D-LMA 255 has a corresponding destination address block 456). Each address block, such as destination address block 456, has an input block such as input block 452 which indicates the incoming address that is associated with the data packet that arrives at the network entity. Each address block also has an outgoing address block, such as outgoing address block 454 which indicates the outgoing address from the entity after the entity has attached or detached the addresses so as to forward the data packet.

For example, in the fourth D-LMA's 255 destination address block 456, the fourth D-LMA receives the data packet which only has the HoA of the data packet in the input block 452. Based upon the network system's 200 internet protocol, the fourth D-LMA 255 may find that the first MN's 260 HoA belongs to the H-LMA 215. Therefore, the fourth D-LMA 255 may bind the first MN's 260 HoA with the address of H-LMA 215, as shown within the outgoing address block 454.

Furthermore, in addition to simply directing the initial data packet to its desired destination, the H-LMA 215 also sends the current address of the first MN 260 back to the fourth D-LMA 255 (represented in FIG. 4 by dashed line 410), which saves the address information in its memory. As shown in a destination address block 458 of the network layer destination address chart 450, the destination address in the fourth D-LMA 255 changes from an address pointing to the H-LMA 215 (shown in the destination address block 456) to an address pointing to the third D-LMA 245 (shown in the destination address block 458).

Figure 5:
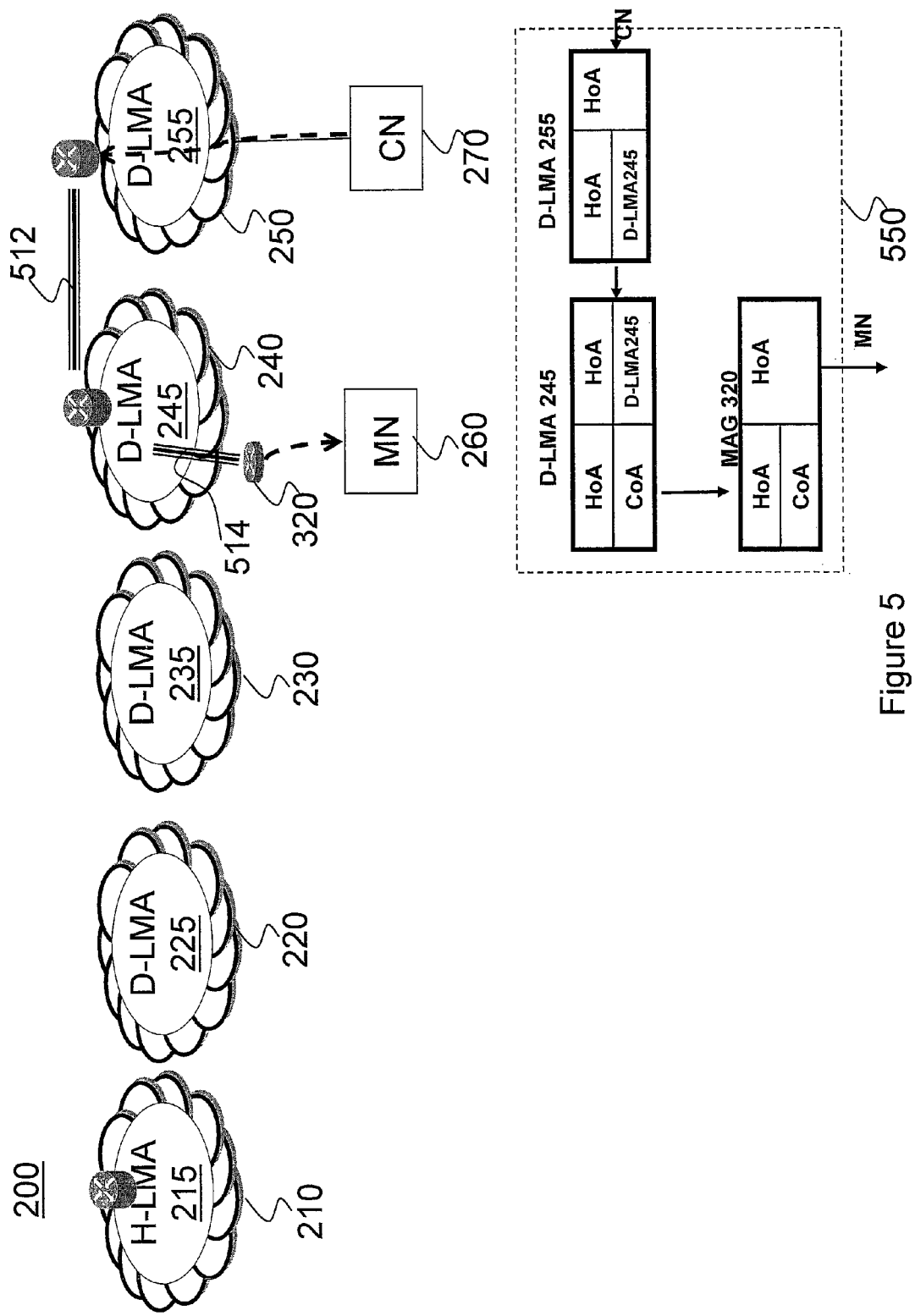
FIG. 5 illustrates a transmission of subsequent data packets from a correspondent node to a mobile node in accordance with an embodiment of the present invention.

FIG. 5 illustrates a path taken by subsequent, non-initial data packets between the CN 270 and the first MN 260. As shown in a network layer destination address chart 550, the fourth D-LMA 255 has acquired the mapping information between the first MN 260's HoA and the destination address, which is the third D-LMA 245. The fourth D-LMA 255 can use this new destination address to forward the subsequent data packets directly to the third D-LMA 245, thereby effectively bypassing the H-LMA 215 from the transmission of subsequent data packets and eliminating the triangle problem after the initial data packet.

Once the third D-LMA 245 has received each of the subsequent data packets, the third D-LMA 245 will tunnel each of the subsequent data packets using the proxy-CoA of the first MN 260. The fourth D-LMA 255 is coupled to the third D-LMA 245 via a first tunnel 512. Similarly, a second tunnel 514 bridges the gap between the third D-LMA 245 and the second MAG 320. These tunnels can transmit data packets between two network elements. On the other hand, tunnels play an instrumental role of hiding a network's topology by encapsulating data packets. For example, when the CN 270 sends a data packet addressed to the first MN 260, the fourth D-LMA 255 may intercept the data packet and encapsulate the data packet so that it conforms to the protocol in the network system 200. The encapsulated data packet may then be transmitted through the first tunnel 512. At the other end of the first tunnel 512, the third D-LMA 245 receives the encapsulated data packet and de-encapsulates the data packet in accordance with the protocol in the network system 200.

From the de-encapsulated data packet, the third D-LMA 245 identifies the destination of this data packet addressed to the first MN 260. The third D-LMA 245 repeats the encapsulation process again before the third D-LMA 245 sends the encapsulated data packet to the second MAG 320 via the second tunnel 514. From the description above, the encapsulation and de-encapsulation processes at two ends of a tunnel prevent a sender from disclosing its location privacy.

Referring to FIG. 5 again, this embodiment shows an optimized route from the CN 270 to the first MN 260 by removing unnecessary tunnels connecting with the H-LMA 215. Furthermore, the optimized routing path including the first tunnel 512 and the second tunnel 514 provides adequate location privacy by employing the encapsulation and de-encapsulation processes at each tunnel's egress and ingress respectively.

Figure 6:
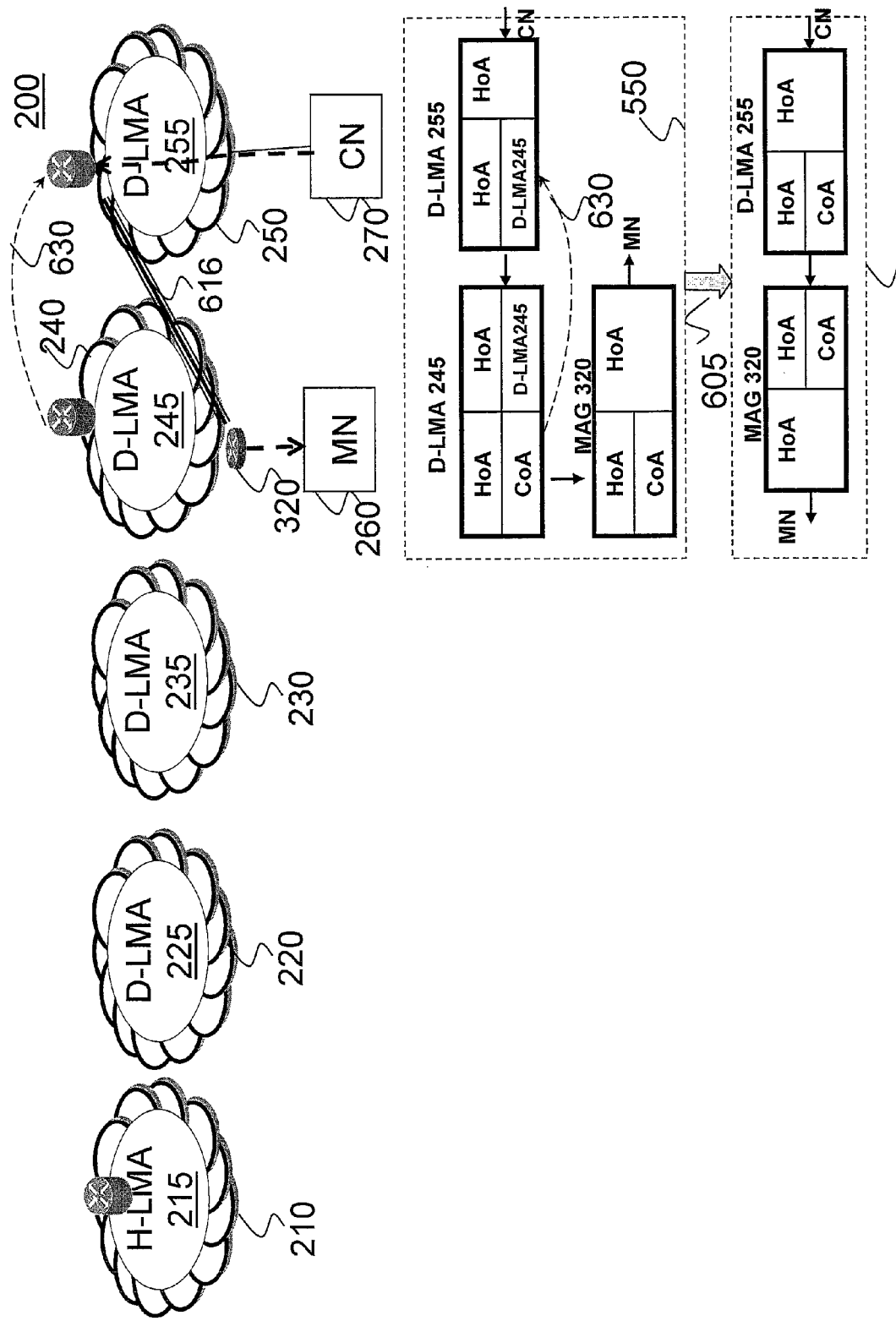
FIG. 6 illustrates a transmission of data packets from a distributed local mobility anchor to a mobility access gateway in accordance with an embodiment of the present invention.

FIG. 6 illustrates a further optimization in which the third D-LMA 245 is removed from the transmission path. In the network layer destination address chart 550 (from FIG. 5, discussed above), the memory of the third D-LMA 245 stores a piece of address mapping information in which the first MN's 260 HoA binding with the third D-LMA's 245 address is mapped with the first MN's 260 HoA binding with the second MAG's 320 CoA. This mapping stored in the third D-LMA's 245 memory guides the third D-LMA 245 to forward the data packets addressed to the first MN's 260 HoA directly to the second MAG 320.

In an embodiment illustrated in FIG. 6, the third D-LMA 245 may identify the first tunnel 512 (not shown in FIG. 6 but illustrated in FIG. 5) being coupled to the fourth D-LMA 255, which is the source of the data packets. The third D-LMA 245 may inform the fourth D-LMA 255 of a new destination address pointing to the proxy-CoA of the first MN 260 (represented in FIG. 6 by dashed line 630). Accordingly, the fourth D-LMA 255 can update the address binding (the update being represented in FIG. 6 by arrow 605) by adding the first MN's 260 proxy-CoA as its new destination address, and then forward subsequent data packets to the second MAG 320.

A network layer destination address chart 614 of FIG. 6 illustrates the binding update in the fourth D-LMA 255 in which the first MN's 260 HoA is bound with the second MAG's 320 CoA. Subsequently, the fourth D-LMA 255 will redirect the packets addressed to the first MN's 260 HoA to the second MAG's 320 CoA. As shown in FIG. 6, subsequent data packets are transmitted from the fourth D-LMA 255 to the second MAG 320 directly via a third tunnel 616. The third tunnel 616 helps to provide adequate location privacy for the data transmission between the fifth network 250 and the fourth network 240.

Figure 7:
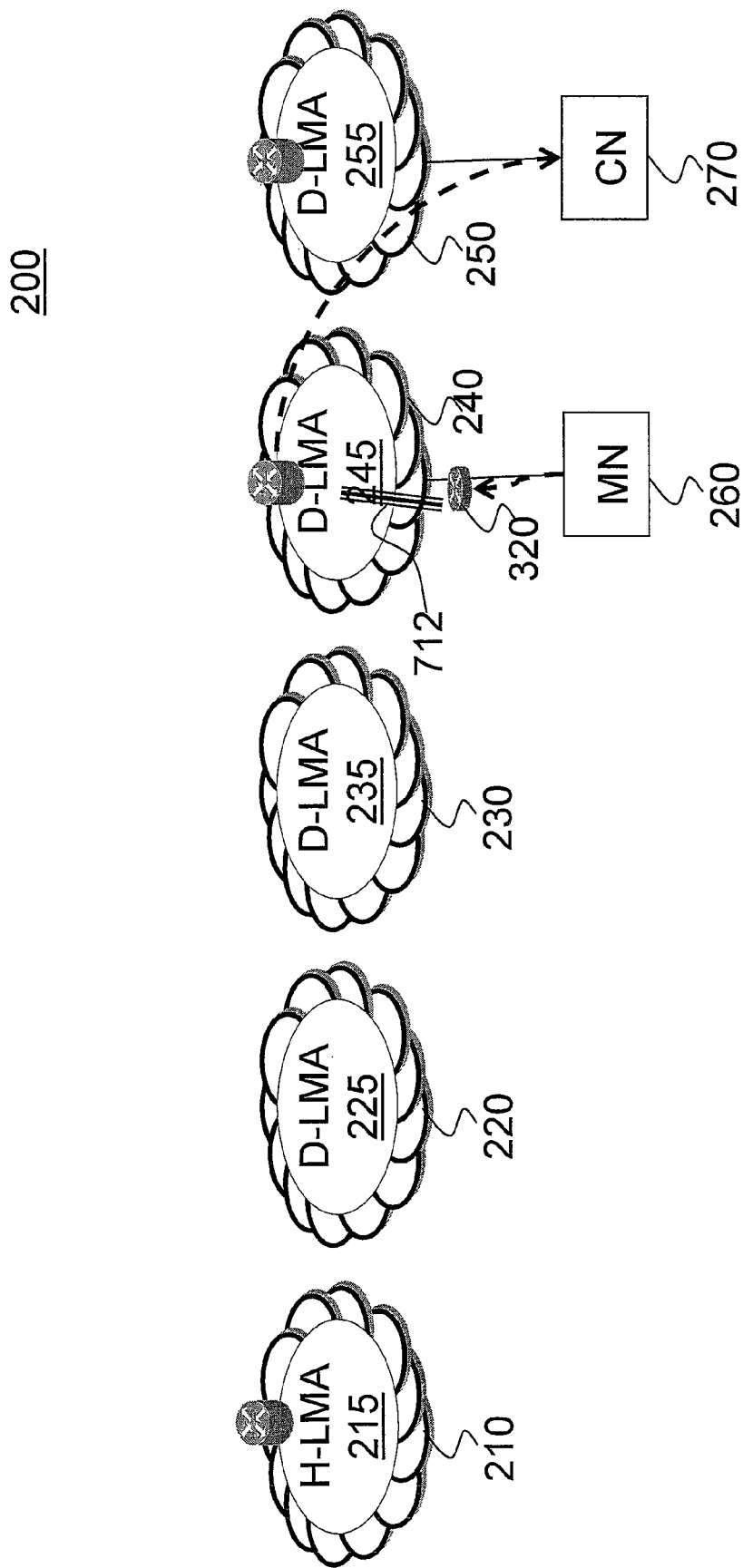
FIG. 7 illustrates a use of mobility routing optimization to deliver data packets from a mobile node to a correspondent node in accordance with an embodiment of the present invention.

FIG. 7 illustrates a communication between the first MN 260 and the CN 270, which has a fixed location that is already known to the third D-LMA 245. The data packets from the first MN 260 do not encounter the triangle routing problem because the third D-LMA 245 is capable of directing the data packets to the CN 270 using, for example, the mobility routing function. As such, the data packets from the first MN 260 that are addressed to the CN 270 may go through a fourth tunnel 712 bridging the second MAG 320 and the third D-LMA 245 in order to preserve the first MN's 260 location privacy.

Figure 8:
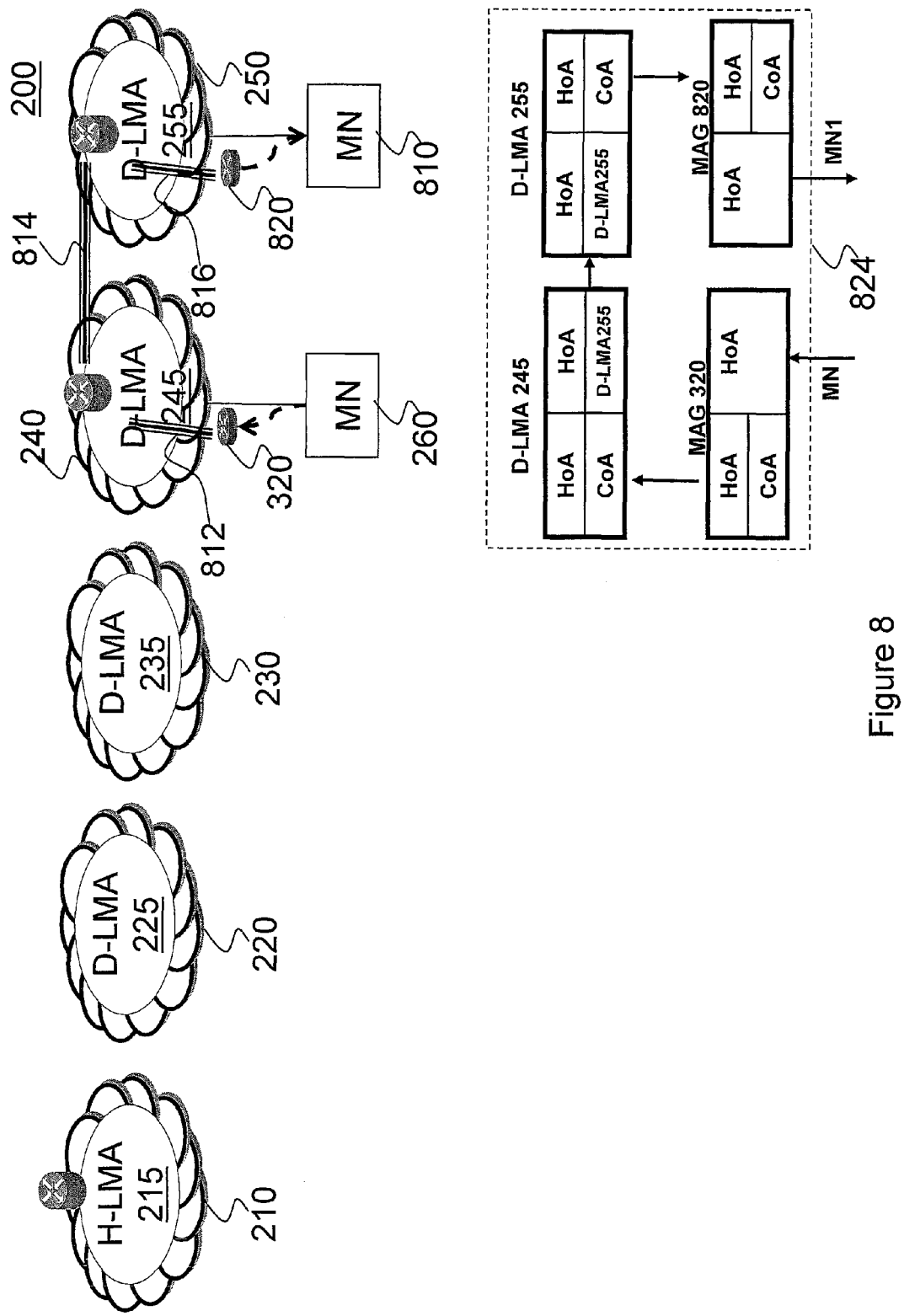
FIG. 8 illustrates a use of mobility routing optimization to deliver data packets from a mobile node to another mobile node in accordance with an embodiment of the present invention.

FIG. 8 illustrates a data packet transmission path from the first MN 260 to a second MN 810 through a third MAG 820, the fourth D-LMA 255, the third D-LMA 245, and the second MAG 320. FIG. 8 also illustrates a corresponding network layer destination address chart 824. As illustrated, the first MN 260 may be anchored to the third D-LMA 245 via the second MAG 320 in the fourth network 240, and the second MN 810 may be anchored to the fourth D-LMA 255 via a third MAG 820 in the fifth network 250. In this embodiment, the third D-LMA 245 has acquired the proxy-CoA of the MN 710 from a previous initial data packet transmission (which went through the H-LMA 215 as described above with respect to FIG. 4). Thus, after the third D-LMA 245 receives the data packets addressed to the MN's 710 HoA, it sends the data packet to the fourth D-LMA 255 directly. The fourth D-LMA 255 may then forward the data packets to the third MAG 820 based upon the proxy-CoA when using PMIPv6. It should be noted that the third D-LMA 245 may repeat the initial data packet process described above with respect to FIG. 4 so as to acquire the second MN's 810 new proxy-CoA from the H-LMA 215 if the second MN's 810 address is not already in the third D-LMA's 245 memory.

The data transmission route illustrated in FIG. 8 has three tunnels. A fifth tunnel 812 links the second MAG 320 with the third D-LMA 245; a sixth tunnel 814 bridges the third D-LMA 245 and the fourth D-LMA 255; a seventh tunnel 816 connects the fourth D-LMA 255 with the third MAG 820. In FIG. 8, both the third D-LMA 245 and the fourth D-LMA 255 are connected with two tunnels. In the network layer destination address chart 824, the third D-LMA 245 maps the second MN's 810 HoA with the fourth D-LMA's 255 address. Once the third D-LMA 245 receives data packets addressed to the second MN's 810 HoA, the third D-LMA 245 may forward the data packets to the fourth D-LMA 255 according to the address binding map saved in its memory. The network layer destination address chart 824 shows the address mapping stored in the fourth D-LMA 255 where the second MN's 810 HoA is mapped with the third MAG's 820 CoA. Thus, the fourth D-LMA 255 redirects the data packets to the third MAG 820 in which the data packets are forwarded to the second MN 810.

Figure 9:
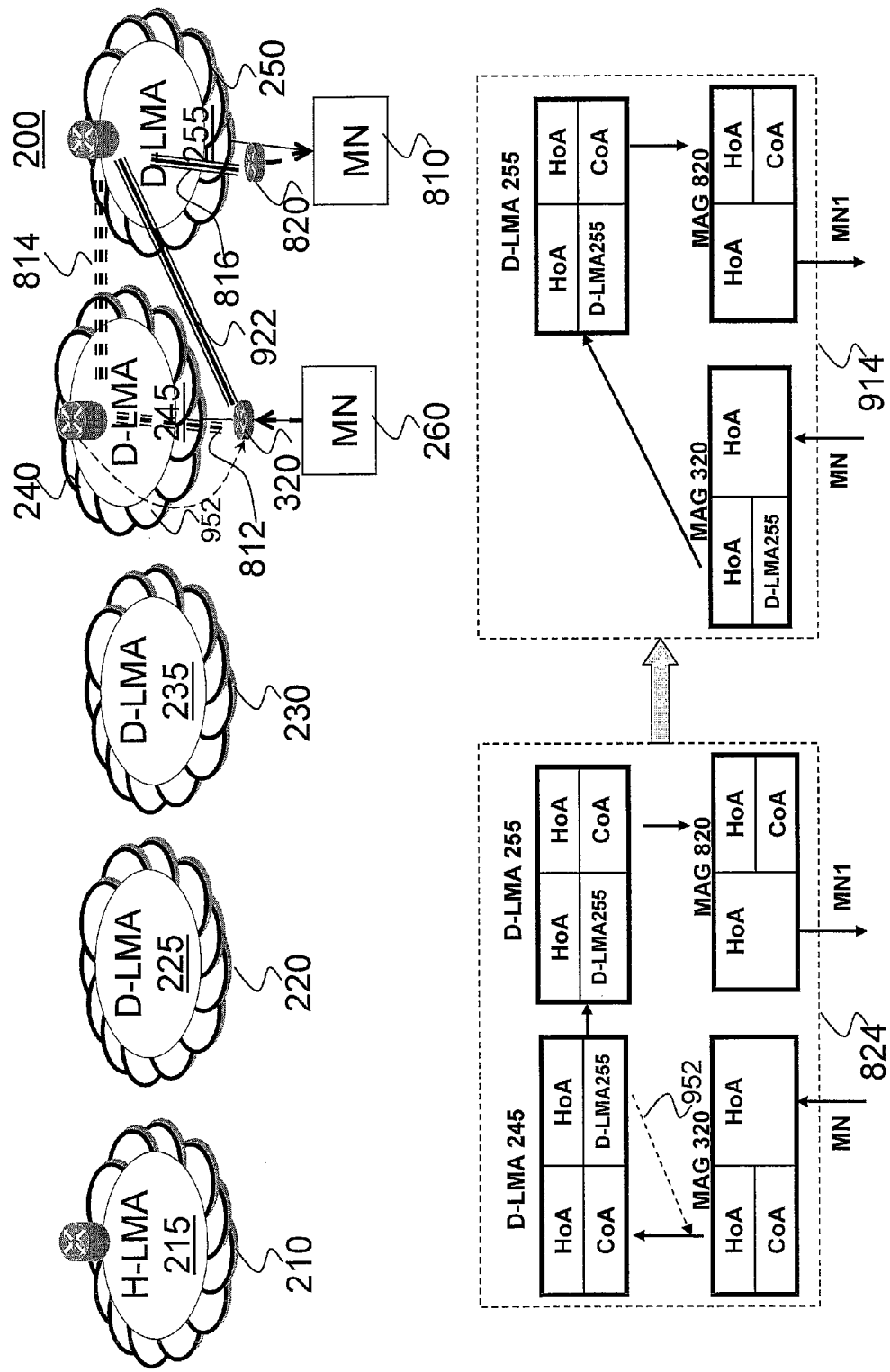
FIG. 9 illustrates a transmission of data packets from a mobility access gateway to a distributed local mobility anchor in accordance with an embodiment of the present invention.

FIG. 9 illustrates a further optimization in which the third D-LMA 245 may be removed from the transmission path. The third D-LMA 245 can be removed from the data transmission path because the third D-LMA 245 is connected with two tunnels at the same time (e.g., the third D-LMA 245 connecting with the fifth tunnel 812 and the sixth tunnel 814). In this embodiment, after detecting both its egress and ingress are connected with tunnels, the third D-LMA 245 can enable the second MAG's 320 mobility routing function and transfer the second MN's 810 HoA address mapping to the second MAG 320 (as illustrated by dashed line 952). A network layer destination address chart 914 illustrates the destination address of the second MAG 320 is updated to the destination address of the third D-LMA 245 in the network layer destination address chart 824 (discussed above with respect to FIG. 8 and recreated in FIG. 9 to illustrate the update and replacement), thereby skipping the third D-LMA 245. Accordingly, after removing the third D-LMA 245 from the data transmission path, the network protocol links the second MAG 320 with the fourth D-LMA 255 via a eighth tunnel 922.

Figure 10:
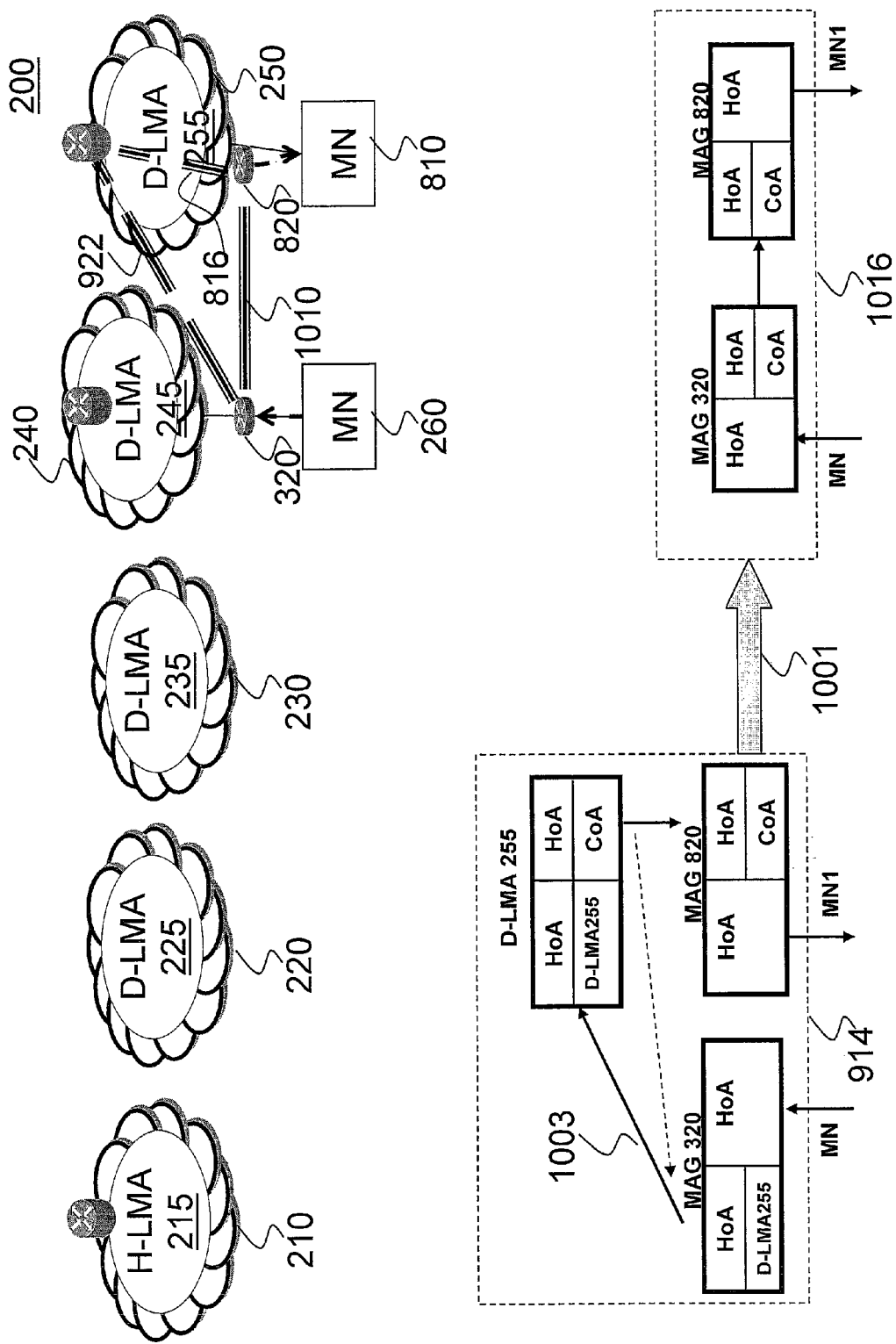
FIG. 10 illustrates a transmission of data packets from a mobility access gateway to another mobility access gateway in accordance with an embodiment of the present invention.

FIG. 10 illustrates a further optimization of the transmission path by sending data packets from the third MAG 820 directly to the second MAG 320. The fourth D-LMA 255 detects the eighth tunnel 922 at its ingress and the seventh tunnel 816 at its egress. Given this double tunnel, the fourth D-LMA 255 may inform the second MAG 320 of the address mapping between the second MN's 810 HoA and the third MAG's 820 CoA as illustrated by the dashed line 1003. Accordingly, the second MAG 320 can replace the fourth D-LMA's 255 address with the third MAG's 820 CoA in the address binding for the second MN's 810 HoA, thereby bypassing the fourth D-LMA 255. A network layer destination address chart 1016 illustrates the address mapping change from the network layer destination address chart 914 (discussed above with respect to FIG. 9 and reproduced in FIG. 10 for convenience) at the second MAG 320 (the change being represented by arrow 1001). Subsequently, the second MAG 320 sends the data packets addressed to the second MN 810 to the third MAG 820 via a ninth tunnel 1010 directly. By applying the method proposed, the network system 200 achieves a further optimized route between the first MN 260 and the second MN 810 by removing unnecessary tunnels.

However, as one of ordinary skill in the art will recognize, the above described process and its associated order of steps is merely exemplary and is not intended to limit the present invention in any fashion. Any suitable order of process steps may be utilized in the optimization routine described above. Additionally, a similar optimization routine may be utilized to optimize the data path from the second MN 810 to the first MN 260.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of transmitting data, the method comprising:
   transmitting a first data packet directly through a tunnel with a first end at a first distributed local mobility anchor in a first network, the first network also comprising a first mobility access gateway, the tunnel having a second end at a second mobility access gateway of a second network, the second network comprising a second distributed local mobility anchor, wherein the first distributed local mobility anchor and the first mobility access gateway have a first common internet protocol address and wherein the second distributed local mobility anchor and second mobility access gateway have a second common internet protocol address different from the first common internet protocol address; and
   receiving a second data packet from the second network at the first network.

2. The method of claim 1, wherein the transmitting a first data packet directly through the tunnel from the first network comprises transmitting the first data packet directly through the tunnel from the first mobility access gateway to the second mobility access gateway.

3. The method of claim 1, wherein the receiving the second data packet from the second network at the first network further comprises transmitting the second data packet from the second distributed local mobility anchor to the first distributed local mobility anchor, the first data packet comprising an address of the second mobility access gateway.

4. The method of claim 1, further comprising transmitting a data packet from the second distributed local mobility anchor to the first mobility access gateway, the data packet comprising an address of the second mobility access gateway.

5. The method of claim 1, further comprising providing the first distributed local mobility anchor an address of the second distributed local mobility anchor, the address of the second distributed local mobility anchor being provided by a home local mobility anchor.

6. The method of claim 1, wherein the first network and second network are configured in a proxy mobile internet protocol version 6 configuration.

7. A method of transmitting data, the method comprising receiving a first series of data packets at a first mobility access gateway, the first series of data packets originating from a common source, wherein at least one of the first series of data packets is received from a first distributed local mobility anchor and at least one of the first series of data packets is received from other than the first distributed local mobility anchor, wherein the first distributed local mobility anchor comprises a first set of functionalities comprising one or more but not all of home address allocation, internetwork location management, and mobility routing, and a home distributed local mobility anchor comprises a second set of functionalities comprising all of the home address allocation, internetwork location management, and mobility routing.

8. The method of claim 7, wherein the other than the first distributed local mobility anchor comprises a second distributed local mobility anchor.

9. The method of claim 8, further comprising transmitting an address of the first mobility access gateway from the first distributed local mobility anchor to the second distributed local mobility anchor.

10. The method of claim 7, wherein the other than the first distributed local mobility anchor comprises a second mobility access gateway.

11. The method of claim 10, further comprising transmitting an address of the first mobility access gateway from the first distributed local mobility anchor to the second mobility access gateway.

12. The method of claim 11, further comprising transmitting a second series of data packets from the first mobility access gateway to the second mobility access gateway.

13. A method for transmitting data, the method comprising:
generating a first connection between a first mobile access gateway in a first network and a first network element of a second network, wherein elements within the first network share a first internet protocol address and elements within the second network share a second internet protocol address different from the first internet protocol address, the first network comprising a first distributed local mobility anchor communicably coupled to the first mobile access gateway, wherein the first network element is a second distributed local mobility anchor communicably coupled to the first distributed local mobility anchor, wherein the first distributed local mobility anchor has a first set of functionalities and a home distributed local mobility anchor has a second set of functionalities, wherein the second set of functionalities comprises home address allocation, internetwork management, and mobility routing and the first set of functionalities comprises one or more but not all of the home address allocation, the internetwork management, and the mobility routing; and
transmitting at least one data packet along the first connection directly through a tunnel, the tunnel extending between the first network element and to the first mobile access gateway.

14. The method of claim 13, wherein the first network element encapsulates the at least one data packet before the at least one data packet is transmitted.

15. A system for transmitting data, the system comprising:
a first network comprising a first mobile access gateway, wherein elements within the first network share a first common internet protocol address;
a second network comprising a second mobile access gateway and a first distributed local mobility anchor, wherein elements within the second network share a second common internet protocol address different from the first common internet protocol address, the second mobile access gateway is configured to receive a first data packet directly through a first tunnel, the first data packet staying within the first tunnel from the first distributed local mobility anchor to the second mobile access gateway and to receive a second data packet directly through a second tunnel, the second data packet staying within the second tunnel from a second distributed local mobility anchor in the first network to the second mobile access gateway.

16. The system of claim 15, wherein the second mobile access gateway is configured to receive the second data packet directly through the second tunnel from the first mobile access gateway.

17. The system of claim 15, further comprising a third network comprising a home local mobility anchor, the home local mobility anchor configured to forward an address of the first distributed local mobility anchor to the first network.

18. The system of claim 17, wherein the home local mobility anchor has a first set of functions and the second mobile access gateway has a second set of functions smaller than the first set of functions.

19. The system of claim 15, further comprising a mobile node communicably coupled to the second mobile access gateway.

20. The system of claim 15, wherein the first network and second network are configured in a proxy mobile internet protocol configuration.

* * * * *